(12) United States Patent
Pink et al.

(10) Patent No.: US 10,296,323 B2
(45) Date of Patent: May 21, 2019

(54) SYSTEM AND METHOD FOR FAST INITIAL AND INCREMENTAL DEPLOYMENT OF APPS

(71) Applicant: ZeroTurnaround AS, Tartu (EE)

(72) Inventors: Madis Pink, Tartu (EE); Allan Raundahl Gregersen, Odense (DK); Rein Raudjärv, Tartu (EE)

(73) Assignee: Zeroturnaround AS, Tartu (EE)

( * ) Notice: Subject to any disclaimer, the term of this patent is extended or adjusted under 35 U.S.C. 154(b) by 0 days.

(21) Appl. No.: 15/421,024

(22) Filed: Jan. 31, 2017

(65) Prior Publication Data

US 2017/0220335 A1 Aug. 3, 2017

Related U.S. Application Data

(60) Provisional application No. 62/290,321, filed on Feb. 2, 2016.

(51) Int. Cl.
*G06F 9/445* (2018.01)
*G06F 8/61* (2018.01)
*G06F 8/658* (2018.01)

(52) U.S. Cl.
CPC ............. *G06F 8/658* (2018.02); *G06F 8/61* (2013.01); *G06F 9/44521* (2013.01); *G06F 9/44536* (2013.01)

(58) Field of Classification Search
None
See application file for complete search history.

(56) References Cited

U.S. PATENT DOCUMENTS

| | | | |
|---|---|---|---|
| 2013/0219379 A1* | 8/2013 | Brauneis | G06F 8/4434 717/158 |
| 2015/0100951 A1* | 4/2015 | Raundahl Gregersen | G06F 8/656 717/166 |
| 2016/0087953 A1* | 3/2016 | Aamir | H04L 63/08 726/1 |
| 2016/0094626 A1* | 3/2016 | Bajaj | H04L 67/10 709/203 |

(Continued)

OTHER PUBLICATIONS

Author: Kabanov, Internet article with Title "Reloading Java Classes 401: HotSwap and JRebel—Behind the Scenes", published on Feb. 11, 2010 (Year: 2010).*

*Primary Examiner* — Daxin Wu
(74) *Attorney, Agent, or Firm* — HoustonHogle LLP

(57) ABSTRACT

A system and method for deploying user apps to user devices is disclosed. A service module on a host system maintains class files of the user app within an original archive, and creates an install agent archive and a modified user app archive from the original archive. In some embodiments, the service module deploys an install agent from the install agent archive and a runtime agent of the modified user app archive to the user device. In other embodiments, the install agent and the runtime agent are pre-installed within a virtual machine of the user device. The install agent receives the class files from the service module, and the runtime agent loads and executes the class files to deploy the user app on the user device. In a preferred embodiment, the system enables faster initial deployment and redeployment of user apps on Android user devices than current systems and methods.

24 Claims, 10 Drawing Sheets

(56) References Cited

U.S. PATENT DOCUMENTS

2016/0170739 A1* 6/2016 Kapashikov ........ G06F 9/44521
717/168
2017/0006045 A1* 1/2017 Kivva .................. G06F 21/561
2017/0102929 A1* 4/2017 Lee .......................... G06F 8/65

* cited by examiner

SYSTEM AND METHOD FOR FAST INITIAL AND INCREMENTAL DEPLOYMENT OF APPS

RELATED APPLICATIONS

This application claims the benefit under 35 U.S.C. § 119(e) of U.S. Provisional Application No. 62/290,321, filed on Feb. 2, 2016, which is incorporated herein by reference in its entirety.

BACKGROUND OF THE INVENTION

User devices is a term that applies to computer systems such as desktop computers, smart televisions (TVs) and mobile computing devices such as laptop computers, mobile phones, tablets, "smart" watches, and glasses, to list a few examples. More specific examples of user devices include smartphones, tablet computing devices, and laptop computers running operating systems such as Windows, Android, Linux, or IOS, in examples.

Software that runs on the user devices can be generally classified as operating systems and software applications. Each user device allows the software applications to be installed on the user device, and then loads and executes the software applications upon the operating system of the user device, a process that is also known as deployment of the software applications to the user devices. The operating system of each user device manages the physical elements or hardware of the user devices such as its central processing unit (CPU) and peripherals. The operating system also presents well-defined Application Programming Interfaces (APIs) to the software applications. The software applications interact with the hardware of the user devices and can access its capabilities via the APIs of the operating system.

Software applications that interact with an operating system are also said to "run on top of" the operating system. Applications that run directly on top of an operating system are also known as native applications. One such software application is a virtual machine (VM).

VMs permit an isolated processing environment to exist on a user device. VMs present this isolated processing environment to other software applications that execute on top of the VMs. The VMs hide or abstract the details of the underlying hardware and/or operating system from the applications that run on top of the VMs. Applications that run on top of VMs of user devices are also known as "apps," or user apps.

Host systems are computer systems that developers use to develop the user apps and prepare the user apps for execution on target user devices. Applications that run on top of VMs of host systems are also known as host applications, or host apps. Developers use host apps and native applications on the host systems to develop and compile the source code of the user apps. The host systems, as the name implies, host files for the user app on file systems of the host systems. Files of the user app include source files and compiled output files. The source files include the source code and resources of the user apps. The compiled output files include the compiled output of the source code, generated by a source code compiler. Often, the source code of the user apps is written using the Java programming language.

Java is a registered trademark of Oracle Corporation. Java source code is included within classes, and a Java compiler converts the source code for each Java class definition into its compiled output, also known as bytecode. Bytecode is typically a set of binary files that include platform-neutral instructions for implementing application behavior, where the bytecode is included in associated "class files" for each Java class definition.

Bytecode executes on VMs. The VMs interpret the bytecode, and execute corresponding native (e.g. machine-dependent) instructions on the target user device associated with the bytecode. Java user apps execute on user devices having Java-compatible VMs.

The term "platform" typically refers to an operating system of a user device or other computer system. One such platform is the Android platform. Android is a registered trademark of Google, Inc. Android is typically a mobile computing system operating system. It is based on the Linux kernel. User devices that support the Android platform/OS are also known as Android user devices. Other user device platforms include Apple IOS, Windows Phone, Raspberry Pi, and Linux, in examples. Regardless of the platform, the terms "classes" and/or "class files" universally refer to the bytecode created by that platform's toolchain for native execution of the user apps on the associated target user device.

While existing user device platforms enable deployment of user apps on user devices, the existing user device platforms typically cannot deploy the classes of the user apps directly. Instead, a software developer using a toolchain on a host system must first prepare the class files, resources, and other platform-specific files of the user app for inclusion within an archive. An archive is a file that has one or more computer files along with metadata. Archive files are used to collect multiple data files together into a single file for easier portability and storage, and/or to compress files to use less storage space. After the toolchain "packages" the class files of the user app into the archive, the toolchain then typically signs the archive using digital public key encryption. The signed archive is then sent to the user device, which decrypts the archive and unpacks its contents. Then, the user device can perform any final platform-specific processing of the unpacked class files prior to execution, a process known as class file optimization. Finally, a VM running on the user device loads the class files and starts the user app, thereby accomplishing the deployment of the user app to the user device.

Deployment of Windows Phone user apps, in one example, requires preparing either XAP or APPX archives including the classes and resources of the user app on a host system, and deploying the archives on a Windows user device having a Windows-compatible VM. The XAP archives are supported on user devices running Windows Phone 7/8/8.1/10 operating system, while the APPX archives are supported on user devices running Windows Phone 8.1 operating system or greater. Windows is a registered trademark of Microsoft, Inc.

In another example, developers of user apps for Apple user devices running the iOS operating system typically prepare archives known as bundles that include the class files and device specific resources of the user app. The Apple user app is then deployed by installing the bundle on an Apple user device, unpacking the class files and resources of the bundles and optimizing the unpacked class files on the Apple user device, and loading the class files on iOS-compatible VM running on the Apple user device.

Deployment of Android user apps, in yet another example, requires preparing an Android application package (APK) archive of the user app on a host system, and then deploying the user app to the user device via the APK of the user app. APK is an archive that is formatted in a fashion similar to ZIP and JAR archives that is used to distribute and install application software and middleware onto Android user devices. Preparation of an APK refers to the steps required to build and sign the APK on a host system to prepare the APK for deployment to a user device. This preparation includes converting the classes of the user app to be in an Android-specific format known as DEX files, including the DEX files along with other Android-specific resources and a manifest file within the APK, and digitally signing the APK. Deploying the user app typically requires installing the user app on the user device by sending the signed APK of the user app to the user device, decrypting the signed APK and unpacking its contents on the user device, optimizing the DEX file(s) of the APK on the user device, and then loading the optimized DEX files and/or resources of the user app into an Android-compatible VM running on the user device and executing the optimized DEX files to execute/start the user app on the user device.

User apps that extend the functionality of Android devices are developed primarily in the Java programming language. Dalvik and Android Runtime (ART) are examples of Android-specific VMs upon which Android user apps execute.

The Dalvik VM cannot execute Java bytecode directly. Dalvik requires that the Java bytecode is first converted into a further form of Android-specific set of native instructions known as Dalvik bytecode/Dalvik executable. Dalvik bytecode is stored in files having a ".dex" extension, also known as DEX files. A tool called "dx" is used to convert Java .class files into the DEX files. For this reason, Android user app developers often use terminology such as "Android user apps are compiled into DEX files" as a shorthand for this process.

ART (Android Runtime) is a more recent VM for Android that improves upon Dalvik. ART accepts DEX files to maintain backwards compatibility to Dalvik. In addition, a new Android development tool suite called the Java Android Compiler Kit (Jack) can directly produce DEX files from Java source code.

Initial startup of a user app refers to the combined steps of the preparation of the APK of the user app and the deployment of the APK. For an initial startup, none of the results from a possible previous build is available to the preparation step.

Incremental startup of a user app refers to the preparation and deployment of the APK of the user app, where all or parts of the output from a previous APK preparation are available.

Optimizing a DEX file on the user device is the process performed by the Android platform to create a pre-verified and optimized file for native execution on the operating system of the user device. On the Dalvik VM, this process is referred to as DexOpt, which, which is really just a back door into the VM. It performs an abbreviated VM initialization process, loads zero or more DEX files from the bootstrap class path, and then sets about verifying and optimizing whatever it can from the target DEX. On the ART runtime, the optimization process is referred to as Dex2Oat, which is a process taken to verify and compile the DEX file into a platform-specific native code block that is highly optimized for the user device.

Current systems and methods for deploying user apps to user devices have problems. First, user apps typically take a significant amount of time to initially install and execute, also known as the initial deployment time of the user app. Additionally, incremental updates to user apps, also known as redeployment of user apps, also take a significant amount of time. The time associated with preparing and redeploying incremental updates to a user app is also known as the turnaround time for a user app.

Current systems and methods for deploying user apps have significant initial deployment times. Current systems that perform initial deployment of Android user apps, in one example, have to first compile the source code of the user app (thus creating DEX files). The systems then process the Android-specific resources, build the APK file, sign the APK, and transfer the APK to the user device. On the user device, the systems unpack the APK, optimize the DEX files, and then startup the user app. For large user apps, all of these operations can be very time consuming, which correspondingly results in a tedious and long initial deployment time.

Current systems and methods for redeploying user apps also have significant turnaround times. Turnaround time includes the time associated with each change and retest of a user app, as part of a compile-uninstall-deploy-start cycle. Long turnaround time is a major issue for developing user apps on Android user devices, in one example.

For incremental updates to Android user apps, developers first make changes to the source code and/or resources of the user app and compile the changes on a host system. The changes to the classes and/or the resources are saved to a host file system of the host system. A new APK of the user app is then created that includes the changes to the classes and/or resources of the user app. The APK is then signed. Then, on the user device, the currently running instance of the user app is stopped, and its current archive/package file is uninstalled. The developer then deploys the new archive/APK of the user app on the user device, where optimization of the DEX files of the new APK must be performed before the user app can begin execution. This process is repeated for each compile-uninstall-deploy-start cycle.

Typically, development of a user app requires applying hundreds or even thousands of these cycles in an iterative fashion. Turnaround time generally increases proportionally with the size of the user app being developed. While the turnaround time can be especially long when initially developing a user app, additions or bug fixes to an already released user app can also have significant turnaround times.

A few projects to date have been created to address the problem of long turnaround time of user apps. One project is Buck Exopackage by Facebook, and another is Mirror by Jimulabs. Another project is the mobile-install Hazel build system by Google, and yet another is Instant Run by Google. Finally, JRebel for Android also implements a mechanism for faster incremental installs of APKs. JRebel is a registered trademark of ZeroTurnaround USA, Inc. However, each of these projects have limitations. The benefits and limitations of each of the projects are described herein below.

Buck Exopackage (hereinafter, "Exopackage") improves the turnaround time in some cases, but not all. In particular, the incremental install implementation in Exopackage enables the sending of individual DEX files to the user device to an already running user app on the device, thereby only requiring the compile code phase, wherein the set of changed DEX files is produced. Hence, this approach skips the steps of creation of a new APK, signing of the APK, and transfer of the full APK to the user device. Then, on the device, Exopackage performs DEX optimizations only for the just received DEX files, thus re-using the unaffected optimized DEX files.

However, Exopackage has many limitations. In one example, its incremental install capability works only if the user makes changes to pure code, for example Java source code. In contrast, any change to an Android resource, which is very common, will cause this approach to be insufficient. This is because changes to resources require that a new full APK be created, signed and transferred to the device, before the possible DEX file optimization can begin. Exopackage also has an intrusive setup that requires modification of the original production source code of the user app to leverage its features. This pollutes the production code of the user app. Exopackage also does not support changes to resources and is limited to one software development build system for Android, the Buck build system. Finally, Exopackage requires extensive changes to build files.

Mirror by Jimulabs provides some support for hot-swapping of Android resources. However, Mirror works only on artificial test apps using test data where it allows to preview changes on the user device. While a limited set of changes can be applied to a test app quickly, the initial as well as the incremental deployment of apps is inherited from the standard Android tool chain. As a result, Mirror developers are often faced with long turnaround times.

A more recent approach is Bazel mobile-install by Google for Android user apps. Bazel is an implementation of incremental install. For this purpose, Bazel strips away as much as possible from the original APK, including Android resources and DEX files while performing the initial install. The resulting (much smaller) APK file is then installed onto the user device with a precompiled service component that is ready to receive the missing Android resources and DEX files. On the next development cycle, when the user has made some changes to the user app, the mobile-install will only need to send deltas to the already installed user app on the user device.

While being a lot faster than a standard Android build, Bazel has many limitations. In one example, the resulting user app that Bazel deploys on the user device is not equivalent to that of the same app installed by an initial install. Most importantly, resources that are installed by Hazel are only available within the user app code itself by direct reference from within the user app code. If the system attempts to reference any resource provided by the app, it will obtain the resources from the latest initial install.

Instant Run is an Android emulator created by Google. Instant Run attempts to address the problem of turnaround time in the sense that it provides a limited set of changes to be applied without having to reinstall the APK on the user device. However, in many cases either an initial install or an incremental install is required. Instant Run does not provide any beneficial improvements over a standard incremental install, thus it will be bottlenecked by the same slow steps of compiling, signing, transferring of the APK to the user device, and DEX file optimizations as standard build tools.

The JRebel tool for Android is another productivity tool that addresses the issue of turnaround time. JRebel is a registered trademark of Zeroturnaround OÜ. The JRebel for Android tool provides some improvements for both initial and incremental install of Android user apps. It does so by allowing for hot-swapping of a large set of changes onto the device without having to re-install the user app. In some cases, a fresh install is required, though. In contrast to Bazel's mobile-install feature, JRebel for Android guarantees that a correct APK is installed onto the device even for an incremental install. However, JRebel is limited by the fact that it has to perform a signing and transfer of a new stripped-down version of the user APK, required for the sake of APK correctness. JRebel is also limited in that that the optimization of DEX files can only begin on the user device after the process of signing and transferring of the new APK has been performed.

SUMMARY OF THE INVENTION

It would be beneficial to deploy user apps in a fashion that significantly decreases initial deployment time of user apps as compared to current systems and methods, while also ensuring that a correctly functioning user app is deployed to the user device. In one example, when the user apps are Android user apps, the proposed system can reduce the initial deployment time of a user app by installing the DEX files of the user app directly to the user device by means of a dedicated install agent, and optimizing the DEX files on the user device as each DEX file is received even before the user app has been installed onto the user device.

In contrast, current systems and methods for initial deployment of user apps require creation of a signed APK that may include the DEX file(s). The user device then receives the signed APK and only thereafter the optimization process of the DEX files can be initiated.

For this purpose, for Android user apps, in one example, the proposed system creates "helper apps" from the APK of the user app on the host system, and deploys the helper apps on the user device. The helper apps include a minimal code footprint install agent APK and a modified user app APK. The APK of the user app is also known as the original user app APK.

The install agent APK is installed to the user device, and an install agent is then deployed on the Android user device from the install agent APK. On the user device, the install agent employs standard file system mechanism to setup a shared data folder on the user device that can be accessed by both the install agent and the modified user app. A service module host app on the host system then sends the DEX files of the original user app APK to the install agent over a communications channel between the host system and the user device. The install agent optimizes each DEX file as each DEX file is received, and stores the optimized DEX files for the user app on the previously setup shared data folder on the user device.

Then, in parallel, the proposed system also creates the modified user app APK on the host system from the APK of the user app. The modified user app APK also includes class files of a runtime agent. An associated modified user app is then deployed on the user device from the modified user app APK, and a runtime agent is consequently deployed on the user device from the runtime agent class files of the modified user app deployed on the user device. On the user device, a classloader of the runtime agent can then access the previously setup shared data folder and load the optimized versions of the DEX files, thereby accomplishing deployment of the user app on the user device.

The time savings achieved when deploying user apps in this fashion is especially apparent during the time-consuming DEX file optimization processing task on Android user devices, in one example. This is because the present system enables the user device to create an optimized version for each DEX file in real time, immediately after the user device receives each DEX file from the host system. In contrast, current systems and methods for deploying user apps must wait to receive a full APK including not only all DEX files but also all of the resources which make up the user app, and then the APK must be unpacked before the user device can optimize the DEX files. In examples, the resources that make up the user app includes Android specific XML resources, native JNI libraries, raw images and other binary files.

It would also be beneficial to redeploy user apps in a fashion that significantly improves turnaround time of the user apps as compared to current systems and methods, while also ensuring that a correctly functioning user app is redeployed to the user device. In another example, when the user apps are also Android user apps, and where an initial version of a user app has already been deployed to an Android user device as summarized herein above, the system also provides the ability to send updated class files of the user app to the user device, and then redeploy the user app with the updated class files. The updated class files are associated with incremental changes to the user app.

For this purpose, with respect to Android user apps, the proposed system prepares a modified user app APK from an APK of the user app on a host system in a fashion similar to the approach of the proposed system for initial deployment of the user app. A modified user app including classes of a runtime agent is then deployed on the user device from the modified user app APK, and the runtime agent is started on the user device. In parallel, the proposed system then detects the updates to the class files on the host system, and sends the updated/changed class files (e.g. Delta DEX files) to the install agent of the user device, where the install agent had been previously deployed during the deployment of the initial version of the user app. The install agent creates optimized versions of the Delta DEX files in response to receiving the Delta DEX files, and the runtime agent loads and executes the Delta DEX files, thereby redeploying the user app with the optimized updated class files.

In general, according to one aspect, the invention features a method for deploying a user app to a user device. The method includes a handler process of an install agent receiving class files of the user app from a host system, the handler process creating optimized versions of the received class files of the user app, and the runtime agent then loading and executing the optimized versions of the class files of the user app.

The handler process preferably starts the optimization of the received class files prior to an installation of the user app on the user device.

In a preferred embodiment, the method maintains the class files of the user app in an application package file using a Dalvik executable (DEX) file format.

A service module application of the host system maintains a user app archive for the user app, wherein the user app archive includes resources, a manifest file, and the class files of the user app. In some embodiments, the service module application deploys the install agent and the runtime agent to the user device.

The service module application preferably creates a modified user app archive for deployment of a modified user app on the user device. The modified user app archive includes the resources of the user app archive and a patched manifest file based upon the manifest file of the user app archive, and also includes classes for creating the runtime agent within the modified user app.

The service module application also preferably creates an install agent archive for deployment of the install agent on the user device. The install agent archive includes an install manifest file based upon the manifest file of the user app archive and includes classes of the handler process for receiving the class files of the user app. The install agent receives the class files of the user app in response to the service module application deploying the install agent.

In one implementation, the service module application sends a start signal to the runtime agent, and the runtime agent loads and executes the optimized versions of the received class files of the user app in response to receiving the start signal. Typically, a class loader of the runtime agent loads and executes the optimized versions of the class files of the user app.

The handler process also receives updates to the class files of the user app and creates optimized versions of the received updated class files in response to receiving each of the received updated class files. A class loader of the runtime agent loads and executes the optimized versions of the updated class files of the user app to redeploy the user app on the user device.

In some embodiments, the install agent including the handler process is pre-installed within a virtual machine of the user device. In some embodiments, the runtime agent is pre-installed within the virtual machine of the user device.

In general, according to another aspect, the invention features a system for deploying a user app. The system includes a host system that maintains class files of the user app, and a user device that executes a runtime agent and an install agent with a handler process. The handler process receives the class files of the user app from the host system and creates optimized versions of the received class files, and the runtime loads and executes the optimized versions of the received class files of the user app.

In a preferred embodiment, the user device is an Android user device. In some embodiments, the host system includes a service module application executing upon the host system that deploys the install agent and the runtime agent to the user device. The handler process preferably starts the optimization of the received class files prior to an installation of the user app on the user device.

In the preferred embodiment, the class files of the user app are included within an application package file having a Dalvik executable (DEX) file format.

The host system maintains a user app archive that includes the class files of the user app, and maintains a modified user app archive that includes resources of the user app archive and a patched manifest file based upon a manifest file of the user app archive and includes classes for creating the runtime agent.

In one implementation, the runtime agent loads and executes the optimized versions of the received class files of the user app in response to receiving a start signal from the host system. Typically, the runtime agent includes a class loader that loads the optimized versions of the received class files of the user app onto a virtual machine of the user device.

The host system includes a service module application that determines updates to the class files of the user app and sends the updated class files to the handler process. The handler process receives the updates to the class files from the service module, and creates optimized versions of the received updated class files of the user app in response to receiving each of the received updated class files. The runtime agent then loads and executes the optimized versions of the received updated class files of the user app.

In some embodiments, the runtime agent is included within a virtual machine of the user device, which has been pre-installed within the virtual machine. In some embodiments, the install agent is included within a virtual machine of the user device, which has been pre-installed within the virtual machine.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
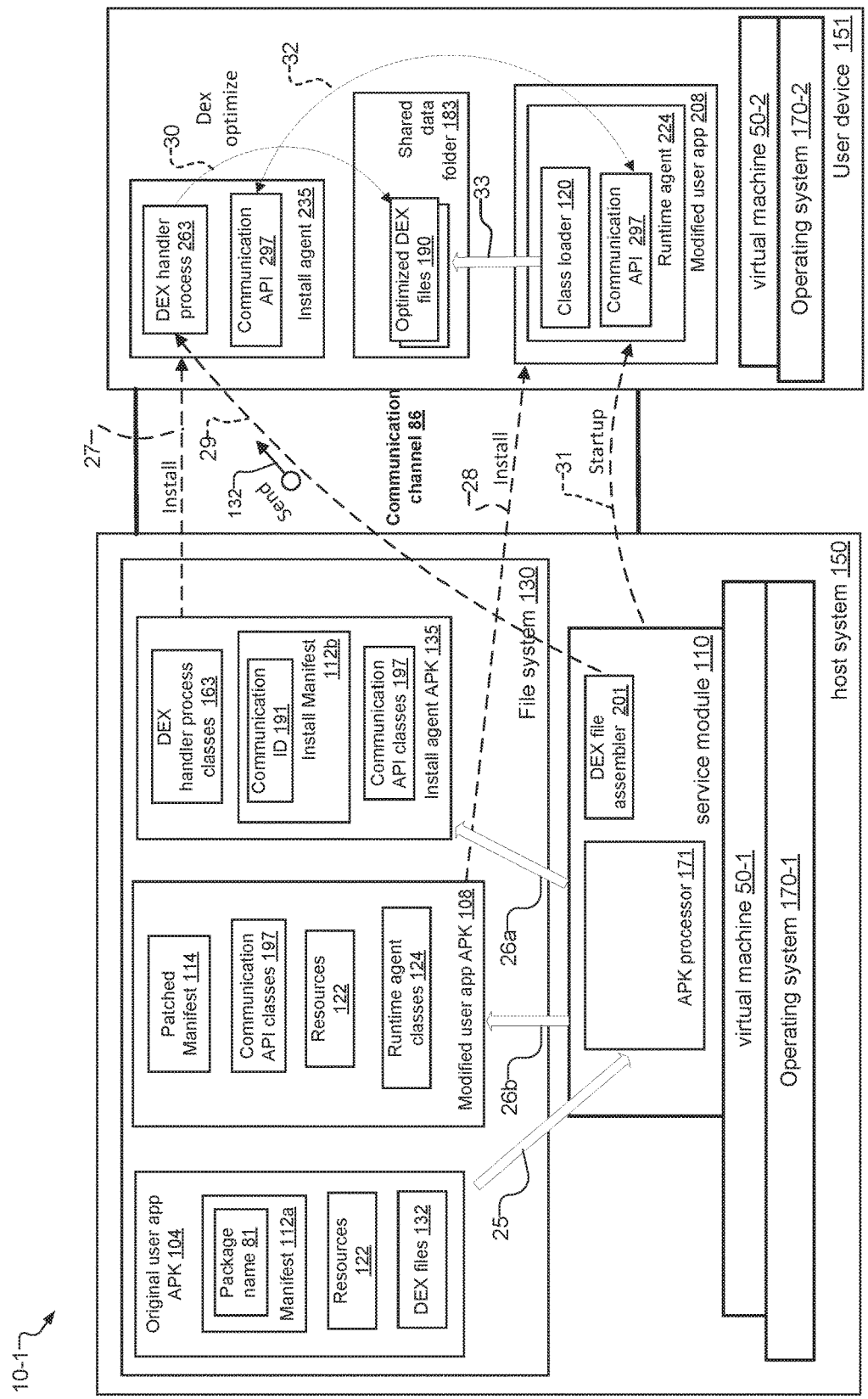
FIG. 1 is a schematic diagram showing a first embodiment of an exemplary user application ("user app") deployment system including a service module application running on a host system, where the host system hosts class files of an Android user app, and where the service module application enables fast initial deployment of the user app to an Android user device.

FIG. 1 shows a first embodiment of an exemplary user app deployment system 10-1 to which the invention is applicable. The system 10-1 provides fast deployment of user apps to a user device 151. The deployment system 10-1 includes a host system 150 that communicates with a user device 151 through a communication channel 86. In a preferred embodiment, the system 10-1 supports fast deployment of Android user apps to Android user devices 151. For this reason, system 10-1 can also be referred to as a deployment system.

The user device 151 includes an operating system 170-2 and a virtual machine 50-2. For an Android user device 151, examples of the virtual machine 50-2 include Dalvik and ART. The host system 150 includes an operating system 170-1, a file system 130, and a virtual machine 50-1. The host system 150 also includes a service module host app ("service module") 110. The service module 110 runs on top of the virtual machine 50-1, and the virtual machine 50-1, in turn, runs on top of the operating system 170-1. The desktop also includes a file system 130 for hosting user apps/archives of user apps during development of the user apps by software developers.

Software developers edit and compile source code of the user apps on the host system 150. The compiled output and resources of the user apps are stored in an archive format, which for an Android user app is an APK. With respect to the illustrated example, original user APK 104 is included within the file system 130 of the host system 150, or "hosted by" the host system 150 for this purpose.

Relevant components of the original user app APK 104 include a manifest 112a, Android-specific resources 122, and DEX files 132 that implement the behavior of an Android user app. The manifest 112a includes a package name 81 that identifies the original user app APK 104. DEX files 132 are class files of the user app that have been converted to a format suitable for execution on a Dalvik virtual machine 50-2 of the user device 151, in one example.

The service module 110 includes software modules or processes that assist in the deployment of the DEX files 132 of the original user APK 104 to the user device 151. These software modules include a DEX file assembler 201 and an APK processor 171. The APK processor 171 reads and processes the contents of the original user APK 104, including its DEX files 132, and the DEX file assembler 201 orchestrates transmission of the DEX files 132 over the communications channel 86 to the user device 151.

The DEX file assembler 201 can optimize the size and number of DEX files 132 transmitted to the user device. In one example, the DEX file assembler 201 can send size-optimized versions of the DEX files 132, based on the number and size of the DEX files in the original user app APK 104. For this purpose, the DEX file assembler 201 can assemble the contents of DEX files 132 into smaller "chunks" of DEX files, upon determining that the original DEX files 132 are sufficiently large in comparison to the available bandwidth of the communications channel 86 between the host system 150 and the user device 151, in one example. The DEX file assembler 201 can also assemble the DEX files 132 into fewer DEX files of larger size. This additional capability of the DEX file assembler 201 further supports the overall purpose of the invention (i.e. fast install of user apps).

The service module 110 does not directly deploy the original user app APK 104 to the user device 151. Instead, the service module 110 creates both a modified user app APK 108 and an install agent APK 135 from the original user app APK 104 as helper components, and saves the modified user app APK 108 and the install agent APK 135 to the file system 130. The service module 110 then deploys a modified user app 208 from the modified user app APK 108 to the user device 151 and deploys an install agent 235 from the install agent APK 135 to the user device 151, in some embodiments. Once deployed on the user device 151, the install agent 235 communicates with the service module 110 over a communication channel 86 to receive the DEX files 132, and creates optimized native code versions of the DEX files, also known as optimized DEX files 190. The optimized DEX files 190 are then loaded and executed by the virtual machine 50-2 of the user device 151, thereby accomplishing deployment of the user app to the user device 151.

To create the modified user app APK 108 and an install agent APK 135, the APK processor 171 of the service module 110 first reads the contents of the original user app APK 104, indicated by arrow 25. The APK processor 171 then parses the manifest 112*a* of the original user app APK 104. The service module 110 then creates the modified user app APK 108 and the install agent APK 135 components in parallel. This is indicated by arrows 26*b* and 26*a*, respectively.

The modified user app APK 108 additionally includes the resources 122 of the original user app APK 104, class files that implement a runtime agent, also known as runtime agent classes 124, and includes class files that implement a communication API, also known as communication API classes 197. A modified user app 208 is ultimately deployed on the user device 151 from the modified user app APK 108, and a runtime agent 224 of the modified user app 208 is ultimately deployed on the user device 151 from the runtime agent classes 124. A communication API 297 of the runtime agent 224 is ultimately deployed on the user device 151 from the communication API classes 197.

To ensure secure communications between the modified user app 208 and the runtime agent 224 after the modified user app 208 and the runtime agent 224 are deployed on the user device 151, the runtime agent classes 124 and the modified user app APK 108 preferably include a common secure communications mechanism. For this purpose, in one implementation, the modified user app APK 108 includes a manifest file that is based upon the manifest file 112*a* of the original user app APK. This patched version of the manifest 112*a* of the original user app APK 104 is also known as a patched manifest 114. The patched manifest 114 includes standard Android permission clauses that setup access privileges for enforcing secure communications between the modified user app 208 and the runtime agent 224 on the user device 151.

To ensure secure communications between the modified user app 208 and the install agent 235 after the modified user app 208 and the install agent 235 are deployed on the user device 151, the install agent 235 and the modified user app APK 108 also preferably include a common secure communications mechanism. For this purpose, in one implementation, the install agent APK 135 includes a minimal "install manifest" file 112*b* based upon the manifest 112*a* of the original user app APK 104. The install manifest 112*b*, in turn, includes a communication ID 191 created by the service module 110. In one example, the communication ID 191 is determined based on the unique package name 81 of the original user app APK 104. The service module 110 can then create the modified user app APK 208 for the modified user app 108 and can create the install agent APK 135 for the install agent 235 with the common communication ID 191. After the modified user app 108 and the install agent 235 are deployed on the user device 151, communications between the modified user app 108 and the install agent 235 can then be established from the runtime agent 224 utilizing the communication ID 191 to enforce secure communications between these processes. The modified user app 208 implicitly knows the communication ID 191 since this is derived from the package name of the original user app APK 104. In one implementation, where the platform is Android, the communication between the install agent 235 and the runtime agent 224 is based on standard Android content providers and/or standard Android services defined within the install agent APK 135.

In another implementation, the install manifest 112*b* includes standard Android permission clauses that setup access privileges to enforce secure communications between the modified user app 208 and the runtime agent 224 on the user device 151. Typically, in the preferred Android embodiment, the access privileges are implemented by means of setting up a custom permission type in the install manifest 112*b* that in turn are utilized within the patched manifest 114 of the modified user app APK 108. In one example, the permission is guarded by the requirement that the modified user app APK 108 and the install agent APK 135 must be signed with the same credentials.

The install agent APK 135 also includes class files that implement a DEX file handler process, also known as DEX handler process classes 163, and includes class files that implement a communication API, also known as communication API classes 197.

In one implementation where the operating system 170-2 is Android, the install agent 135 also includes native .so files corresponding to the specific native architectures found within the original user app APK 104. Architectures can be armeabi, armeabi-v7a, arm64-v8a, x86, x86_64, mips, mips64 in examples. Having the same architectures present within the install agent 235 ensures that the optimized DEX files 190 produced by the install agent 235 is compatible with that of the modified user app. Failing to include these .so files will on some Android devices impose a significant installation slowdown, because the optimized DEX files 190 will be invalidated upon loading, leading to a repeat DEX file optimization process performed this time by the modified user app 208.

After creating the install agent APK 135, the service module 110 uploads the contents of the install agent APK 135 to the user device 151, thereby installing an install agent 235 to the user device 151. This is indicated by reference 27. Once the install agent 235 executes, thereby accomplishing deployment of the install agent 235, the install agent 235 loads and executes the DEX handler process classes 163 to start the DEX handler process 263 on the user device. The install agent 235 also loads and executes its communication API classes 197 to start a communication API 297 process of the install agent 235 on the user device 151.

The DEX handler process 263 on the user device 151 receives the DEX files of the user app sent from the service module 110. Specifically, the DEX file assembler 201 of the service module 110 uploads/sends the DEX files 132 one by one to the DEX handler process 263 on the user device 151. This is indicated by reference 29.

In response to receiving each DEX file 132, the DEX handler process 263 initiates Android-specific optimization of each DEX file 132 and stores a resultant optimized DEX file 190 within a shared data folder 183 of the user device 151. This is indicated by arrow 30. Typically, an optimized DEX file 190 is created for each DEX file 132. In the preferred embodiment where the operating system 170-2 is Android, in one example, the shared data folder 183 is setup by means of symbolic links so that the class loader 120 of the runtime agent 224 reads in the optimized DEX files 190 through the otherwise private data folder of the install agent 235. In another example where the Android platform API level is 21 or 22, specific restrictions on access rights for symbolic links gives rise to an alternate implementation, where direct file copies or moves between the data folders of the install agent 235 and modified user app 208, respectively, establishes a virtually shared data folder 183.

In parallel, the service module 110 at some point finishes the creation of the modified user app APK 108. At this point in time, independent of installing the install agent APK 135 onto the user device, the service module 110 uploads the contents of the modified user app APK 108 to the user device 151, thus installing the modified user app 208. This is indicated by arrow 28. Once the modified user app 208 executes on the user device 151, thereby accomplishing deployment of the modified user app 208, the modified user app 208 loads its runtime agent classes 124 but does not start execution of the runtime agent 224 at this time.

After the DEX file assembler 201 has completed sending all DEX files 132 to the install agent 235, the service module 110 sends a startup command to the runtime agent 224 on the user device 151. This is indicated by arrow 31.

In response to receiving the startup command 31, the runtime agent 224 loads and executes its communication API classes 197 to start a communication API 297 process of the runtime agent 224 on the user device 151. The runtime agent 224, via its communication API 297, initiates communication with the install agent 235 via the communication API 297 of the install agent 235. This is indicated by arrow 32. The main purpose of this communication 32 is to establish a channel for signaling when the optimized DEX files 190 are ready within the shared data folder 183 for loading by the class loader 120. The timely loading of optimized DEX files 190 is indicated by arrow 33. When the DEX handler process 263 sends the "ready" signal to the runtime agent 224, the class loader 120 of the runtime agent 224 loads the optimized DEX files 190 (indicated by arrow 33) from the shared data folder to the virtual machine 50-2, and starts the modified user app 208 on the user device 151.

Upon completion of this sequence, the modified user app 208 executing on the user device 151 behaves in an equivalent manner to that of a standard deployment of the original user app APK 104 onto the user device 151.

Figure 2:
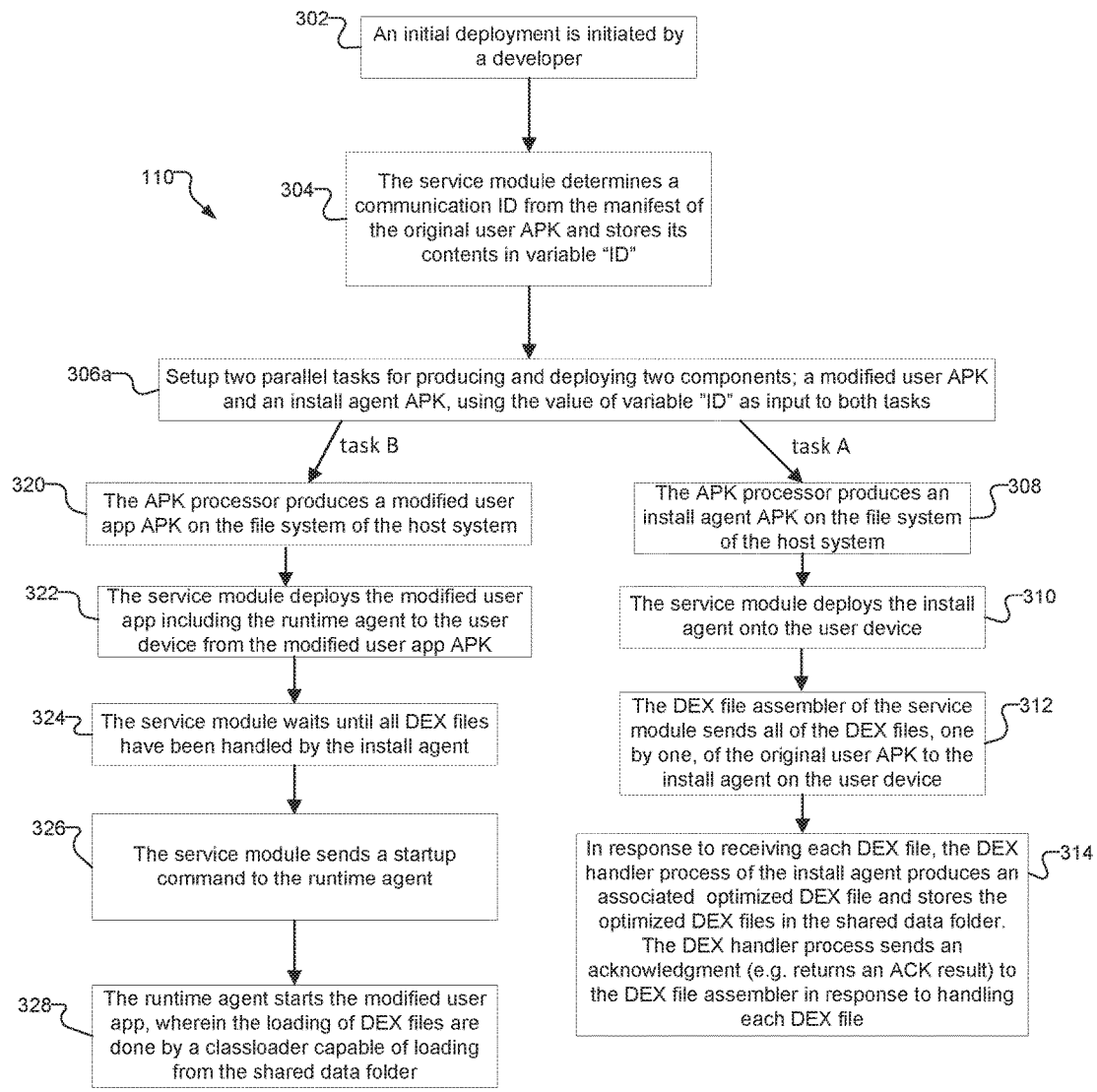
FIG. 2 is a flowchart showing a method for accomplishing deployment of a user app for the user app deployment system of FIG. 1.

FIG. 2 describes the behavior of the service module 110 for the deployment system of FIG. 1, for deployment of APKs of user apps to Android user devices 151.

In step 302, a developer initiates an initial deployment of the original user app APK 104. In step 304, the service module 110 determines a communication ID 191 from the manifest 112a of the original user app APK 104, in one implementation, and stores its contents in variable "M".

Figure 3:
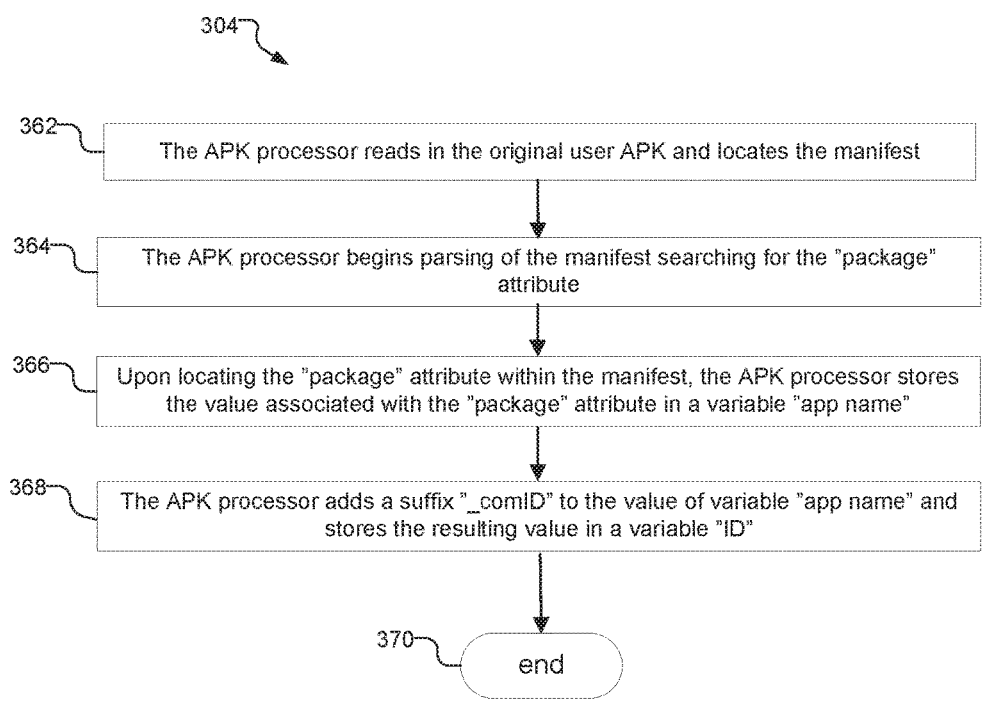
FIG. 3 is a flowchart showing detail for the method of FIG. 2, for determining a communications ID from a manifest file of an original user app APK for the user app.

FIG. 3 provides more detail for step 304 of FIG. 2.

In step 362, the APK processor 171 reads in the original user app APK 104 and locates its manifest 112a. Then, in step 364, the APK processor 171 initiates parsing of the manifest 112a and searches for the "package" attribute. These attributes are well-known attributes of a standard Android manifest file.

Upon locating the "package" attribute within the manifest 112a, in step 366, the APK processor 171 reads the value associated with the "package" attribute and stores it as variable "app name."

According to step 368, the APK processor 171 adds a suffix "_comID" to the value of the "app name" variable and stores the resulting value in the variable "ID". Processing then terminates at step 370.

Returning to FIG. 2, in step 306a, the service module 110 sets up two tasks that run in parallel, using the value of variable "ID" determined in step 304 as input to the tasks. The tasks are indicated by labels "task A" and "task B" in FIG. 2.

Task A produces an install agent APK 135 on the host system 150, and deploys an install agent 235 from the install agent APK 135 on the user device 151. The execution path for task A begins at step 308.

Task B produces a modified user app APK 108 on the host system 150, deploys a modified user app 208 from the modified user app APK 108 on the user device, and deploys a runtime agent 224 of the modified user app 208 on the user device 151 from the runtime agent classes 124. The execution path for task B begins at step 320.

The service module 110 executes task A and task B in parallel. The steps for task A are described first, beginning in step 308.

In step 308, the APK processor 171 of the service module 110 produces an install agent APK 135 on the file system 130 of the host system 150.

Figure 4:
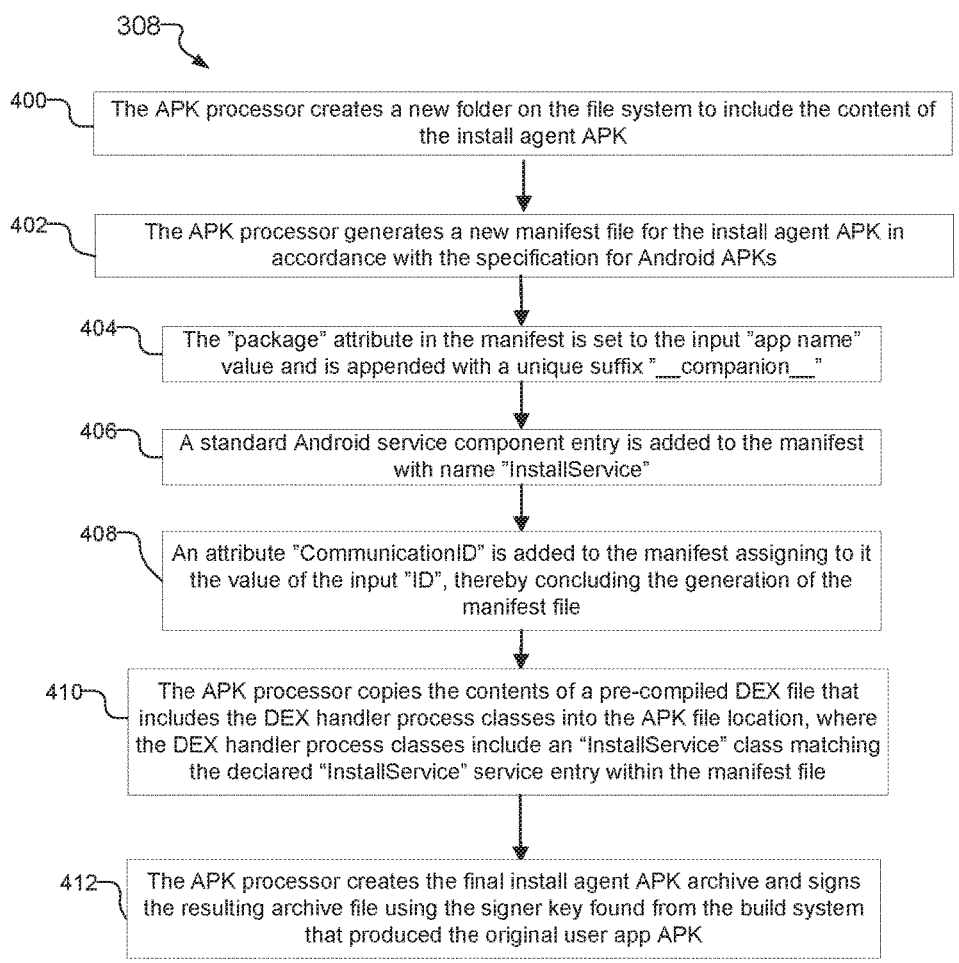
FIG. 4 is a flowchart showing detail for the method of FIG. 2, for creating an install agent APK.

FIG. 4 provides more detail for step 308.

In step 400, the APK processor 171 creates a new folder on the file system 130 to include the content of the install agent APK 135.

In step 402, the APK processor 171 generates a new install manifest file 112b for the install agent APK 135. The manifest is created in accordance with the specification for Android APKs. The install manifest 112b is partially based on the manifest 112a of the original user app APK 104.

In step 404, still generating the install manifest 112b, the "package" attribute in the install manifest 112b is set to the value of the input variable "app name" and is appended with unique suffix "_companion_".

In step 406, still generating the install manifest 112b, the APK processor 171 adds a standard Android service component entry to the install manifest 112b with the declared name "InstallService".

In step 408, still generating the install manifest 112b, a "Communication ID" 191 attribute is added to the install manifest 112b assigning to it the value of the variable "ID". This concludes the generation of the install manifest 112b.

In step 410, the APK processor 171 copies the contents of a pre-compiled DEX file 132 that includes the DEX handler process classes 163 into the install agent APK 135 file location. Included within the DEX handler process classes 163 is the "InstallService" class matching the declared "Install Service" service entry within the install manifest 112b.

In step 412, the APK processor 171 creates the final install agent APK 135 archive, and signs the archive 135 using the signer key found from the build system that produced the original user app APK 104.

Returning to FIG. 2, in step 310, the service module 110 deploys the install agent 235 from the install agent APK 135 onto the user device 151.

Figure 5:
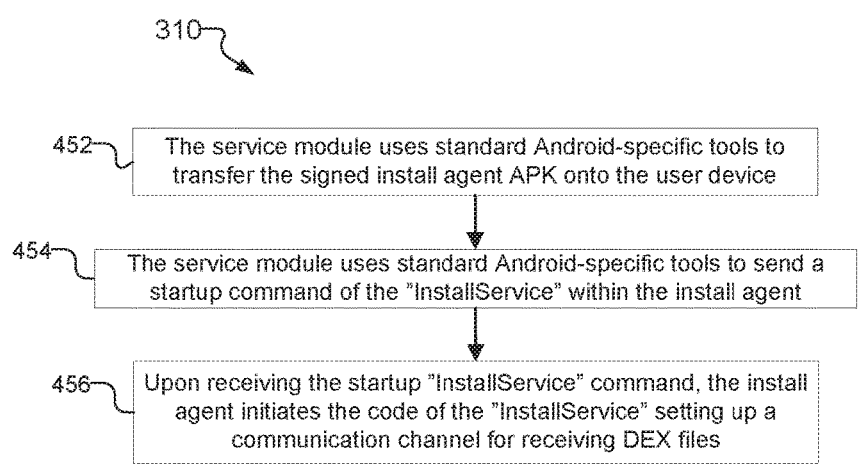
FIG. 5 is a flowchart showing detail for the method of FIG. 2, for installing the install agent APK onto the user device and preparing the install agent to receive incoming class files of the user app in DEX file format from the service module application.

FIG. 5 provides details for FIG. 2 step 310.

In step 452, the service module 110 utilizes standard Android-specific tools to transfer the signed install agent APK 135 onto the user device 151. As a result, the install agent 235 now resides on the user device. In one example, the service module 110 uses the ADB protocol to transfer the signed install agent APK 135 onto the user device 151.

In step 454, the service module 110 uses standard Android-specific tools to send a startup command of the "InstallService" within the install agent 235. In one example, the ADB protocol is used.

In step 456, in response to receiving the startup command, the install agent 235 initiates the code of the "InstallService", thus setting up a communication channel 86 for receiving DEX files 132 from the host system 150. In one example, the HTTP protocol is utilized as the setup communication channel 86.

Returning to FIG. 2, in step 312, the DEX file assembler 201 of the service module 110 sends all of the DEX files 132 of the original user app APK 104, one by one, to the install agent 235 on the user device 151 via the communications channel 86. In examples, the DEX file assembler 201 can send the DEX files 132 "as is," as smaller DEX files from splitting the DEX files of the original DEX files, or as larger merged DEX files 132 to minimize the time required to transfer the DEX files 132 to the user device 151. The DEX file assembler 201 determines which of these methods for assembling the DEX files based on the size and/or number of the DEX files 132, and available bandwidth of the communications channel 86, in examples. This capability can improve the initial deployment time of a user app as compared to current systems and methods.

In step 314, in response to receiving each of the DEX files 132, the DEX handler process 263 produces an associated optimized DEX file 190, and stores the optimized DEX files 190 within the shared data folder 183. The DEX handler process 263 sends an acknowledgement (e.g. returns an ACK result) to the DEX file sender 201 of the service module 110 in response to handling each DEX file 132. In one example, the dex2oat optimizer included within the ART runtime is utilized to produce the optimized DEX files 190. In another example, the dexopt optimizer included within the Dalvik runtime is utilized to produce the optimized DEX files 190.

The steps for task B are described next, beginning in step 320.

In step 320, the APK processor 171 produces a modified user app APK 108 on the file system 130 of the host system 150.

Figure 6:
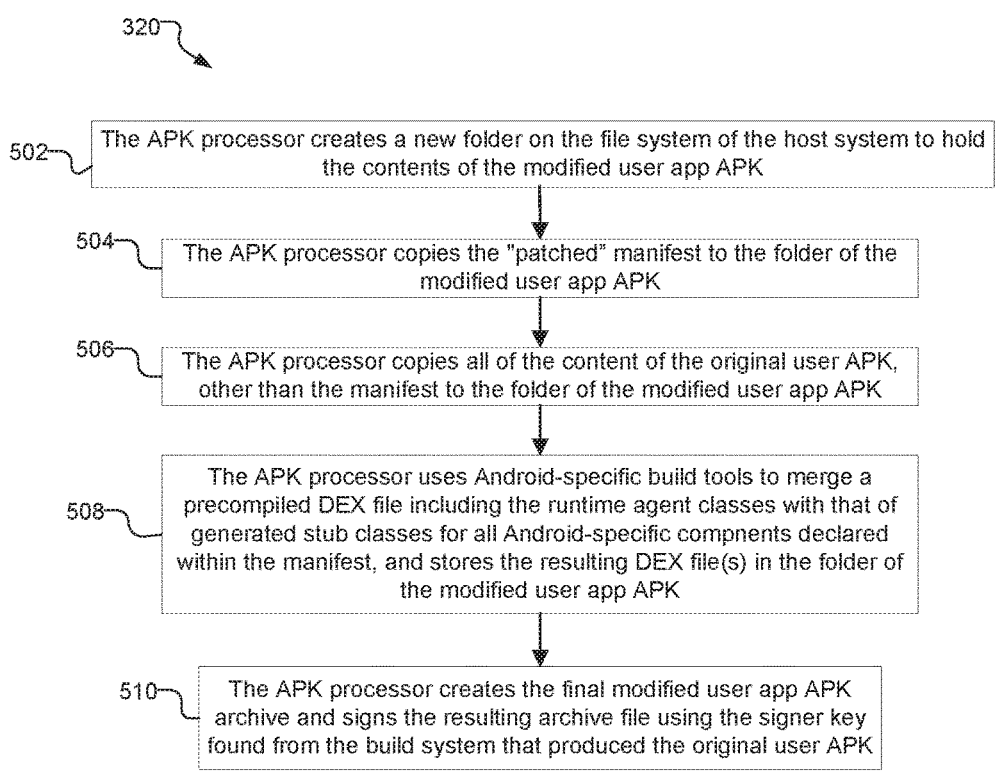
FIG. 6 is a flowchart showing detail for the method of FIG. 2, showing steps taken to create and prepare a modified user app APK on the host system, where the modified user app APK provides a runtime agent that loads and executes the received class files of the user app to thereby accomplish the deployment of the user app to the user device.

FIG. 6 provides detail for step 320 of FIG. 2.

In step 502, the APK processor 171 creates a new folder on the file system 130 of the host system to hold the content of the modified user app APK 108. In step 504, the APK processes 171 copies the "patched" manifest 114 to the folder of modified user app APK 108. According to step 506, the APK processor 171 copies all of the content of the original user app APK 104 other than the manifest 112a to the folder of the modified user app APK 108.

In step 508, the APK processor 171 utilizes Android-specific build tools to merge a precompiled DEX file 132 including the runtime agent classes 124 with that of generated stub classes for all Android-specific components declared within the manifest 112a. The resulting DEX file 132 is then stored at the folder of the modified user app APK 108.

In step 510, the APK processor 171 creates the final modified user app APK 135 archive and signs the archive 135 using the signer key found from the build system that produced the original user app APK 104.

Returning to FIG. 2, in step 322, the service module 110 deploys the modified user app 208 including the runtime agent 224 to the user device 151 from the modified user app APK 108. As a result, the modified user app 208 now resides on the user device 151.

In step 324, the service module 110 waits until all of the DEX files 132 have been handled by the install agent 235. In response to receiving the last ACK from the install agent 235, the service module 110, in step 326, sends a startup command (reference 31) to the runtime agent 224. In one example, the ADB protocol is utilized to send the startup command.

According to step 328, the runtime agent 224 starts the modified user app 208, wherein the loading of classes from DEX files 132 is carried out by a classloader 120 capable of loading from the shared data folder 183. Preferably, the classloader 120 loads classes from the optimized DEX files 190 within the shared data folder.

It is important to note that although the deployment system 10-1 of FIG. 1 and its associated method in FIG. 2 are described for the deployment of user apps to Android user devices 151, the same system 10-1 and method can be adapted to enable deployment of user apps to other user device platforms such as Windows and Apple iOS, in examples. The adaptations required will reference platform-specific archive/package names and may or may not involve optimization of the classes of the user app on the user device 151.

Figure 7:
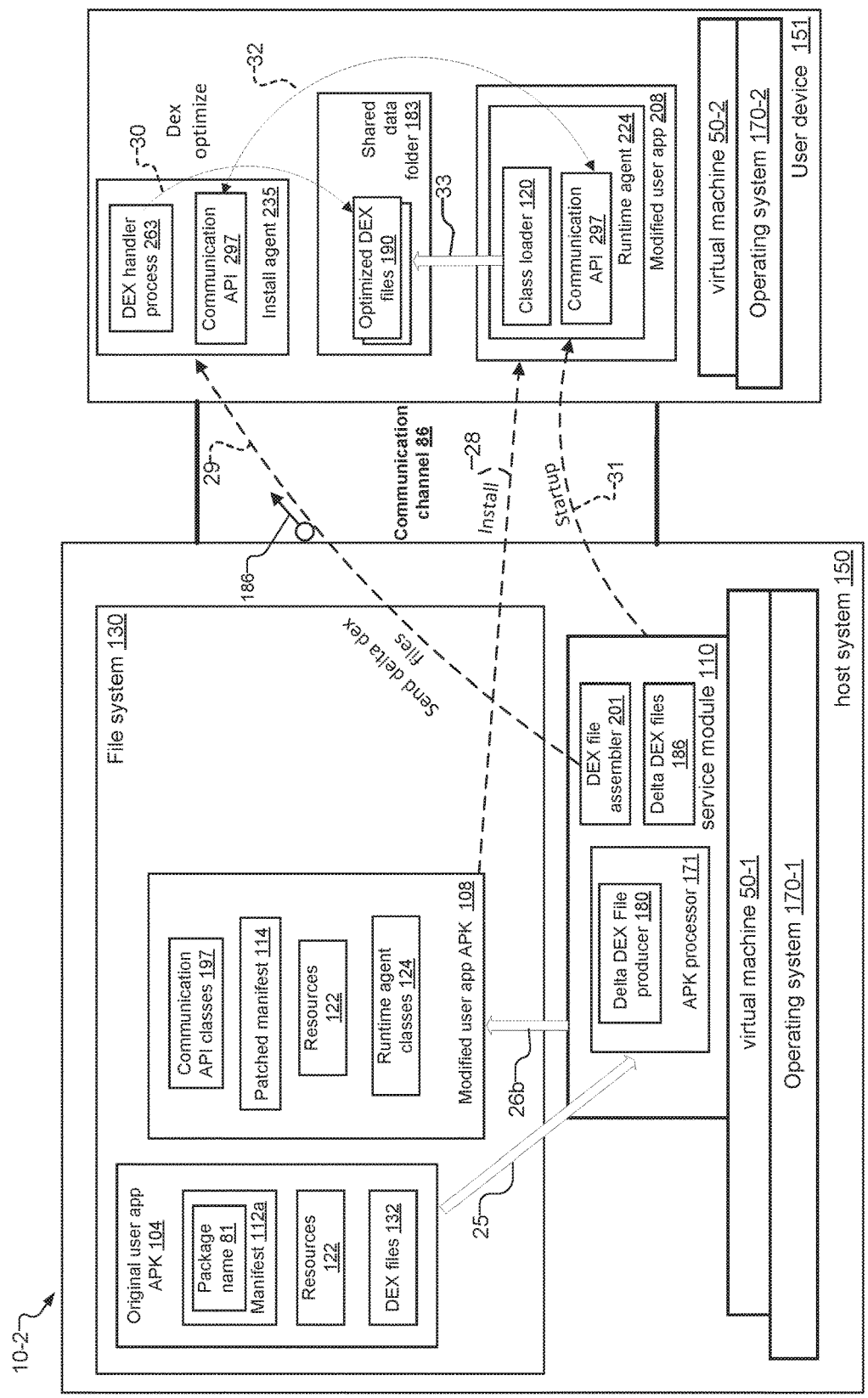
FIG. 7 is a schematic diagram showing another user app deployment system, where the system provides updates to class files of currently running user apps on user devices and redeploys the user apps with the updated class files, when the user apps were initially deployed via the user app deployment system of FIG. 1 and its method described in FIG. 2.

FIG. 7 shows another exemplary user app deployment system 10-2 to which the invention is applicable, also directed to Android user devices 151. The system 10-2 enables incremental updates to user apps, when the user apps were initially deployed by the user app deployment system 10-1 in FIG. 1.

In FIG. 7, currently running instances of user apps are first deployed according to the deployment system 10-1 of FIG. 1 and method of FIG. 2. Then, the deployment system 10-2 enables user devices 151 to receive changes to classes of the user apps sent from a host system 150. Finally, the system 10-2 triggers the redeployment of the user apps including the changes to the class files. Because system 10-2 enables the redeployment of user apps with incremental changes to the user apps, the system 10-2 can also be referred to as a redeployment system.

The system 10-2 is especially useful when software developers are still in the process of designing and testing incremental changes to currently deployed user apps. For this purpose, the changes typically affect isolated components or even only changes to one line of source code. Because hundreds or even thousands of incremental changes to currently running user apps on user devices 151 are typically made during development of user apps, a system that can improve the turnaround time of these incremental changes such as that provided by system 10-2 is an important benefit.

The deployment system 10-2 includes similar components as in the deployment system 10-1 of FIG. 1 and also includes additional components. Because the currently running instance of the user app was deployed according to the system 10-1 of FIG. 1, the install agent 235 and its DEX handler process 263 and communication API 297 are already deployed and do not require installation to and execution upon the user device 151. Additional components in the system 10-2 include a Delta DEX file producer 180 of the APK processor 171. Then, in parallel, the proposed system also creates a modified user app APK 108 on the host system 150 from the AMC of the user app.

Developers typically make changes to parts of an original user app APK 104 during development cycles. In response to a user performing a re-build of the original user app APK 104, the service module 110 orchestrates the creation of a modified user app APK 108 as previously described hereinabove in the description of FIG. 1. The Delta DEX file producer 180 reads the DEX files 132 to determine updates/changes to the class files (e.g. changes to the DEX files 132) of the original user app APK 104, indicated by arrow 27. In response, the APK processor 171, using its Delta DEX file producer 180, creates Delta DEX files 186 for the changes to each of the DEX files 132. Then, the DEX file assembler 201 begins uploading/sending the Delta DEX files 186 to the DEX handler process 263 on the user device 151. This is indicated by arrow 29.

Upon receiving the Delta DEX files 186, the DEX handler process 263 invalidates any optimized DEX files 190 that include a previous version of a changed class. The DEX handler process 263 then produces new optimized DEX files 190 for the received Delta DEX files 186 and stores the resultant optimized DEX files 190 within the shared data folder 183 on the user device 151.

At some point in time, the APK processor 171 completes the creation of the modified user app APK 108 within the file system 130 on the host system 150. In response, the service module 110 deploys the new instance of the modified user app APK 108 onto the user device 151 as previously described in the method of FIG. 2. This is indicated by arrow 28. In one example, where the user apps are Android apps, the deployment of a new version/instance of a modified user app 208 from a modified user app APK 108 automatically uninstalls any prior version of the modified user app 208 on the user device 151. In other examples, platform-specific cleanup of a previously installed modified user app 208 may be required.

The service module 110 then sends startup signal 31 to the newly deployed instance of the modified user app 208. As in the deployment system 10-1 of FIG. 1, upon receiving the startup signal 31, the newly installed instance of the modified user app 208 is executed on the user device 151. The runtime agent 224 is started from the runtime agent classes 124, and the communication API 297 of the runtime agent 224 is started from the communication API classes 197. Finally, the runtime agent 224 of the newly deployed modified user app 208 executes, and the communication API 297 and class loader of the runtime agent 224 execute. When the DEX handler process 263 sends the "ready" signal to the runtime agent 224 (indicated by arrow 32), the and the classloader 120 loads all optimized DEX files 190 for the user app within the shared data folder 183 to the virtual machine 50-2, indicated by arrow 33, to execute the functionality of the user app.

Figure 8:
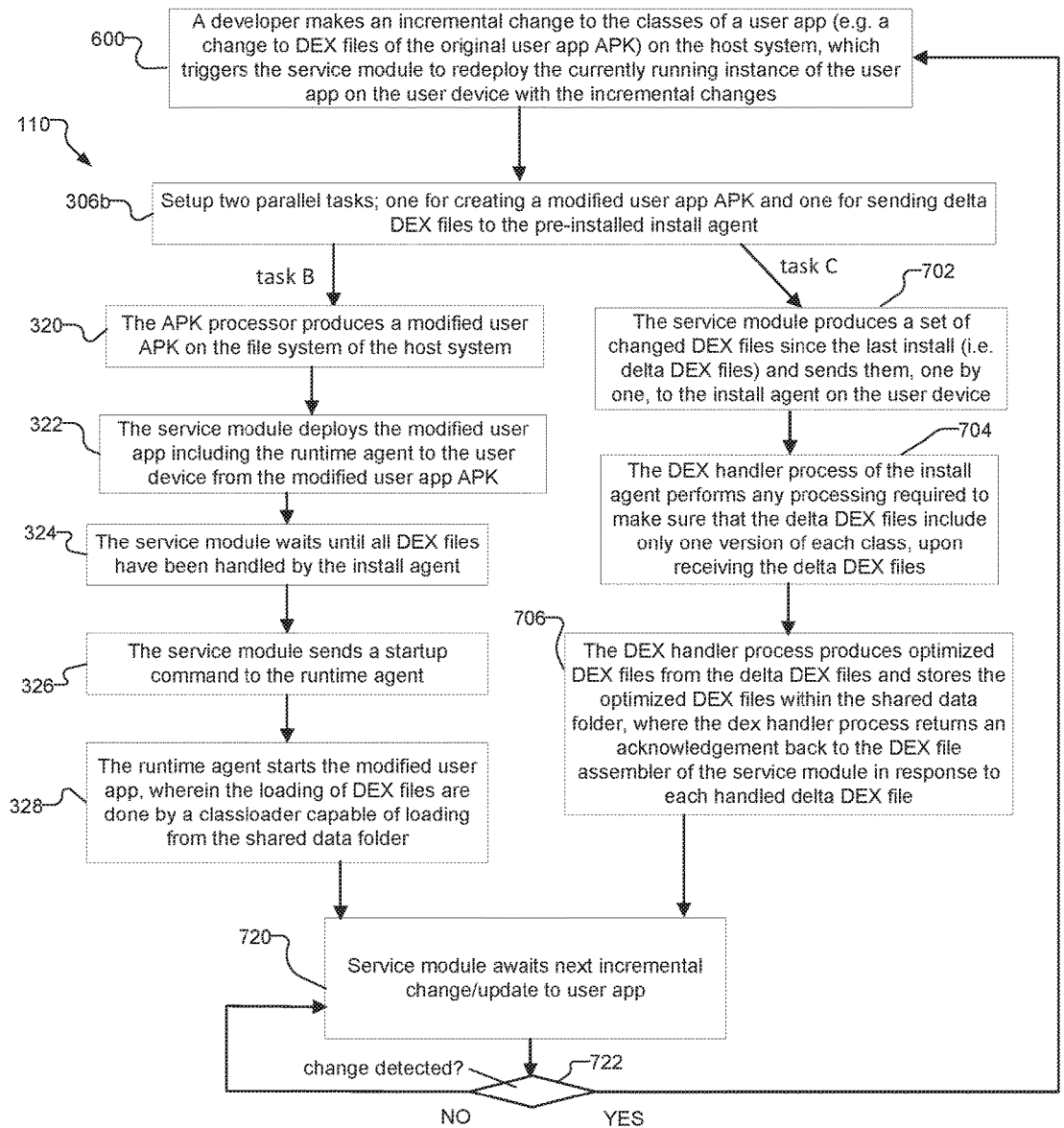
FIG. 8 is a flowchart showing a method for accomplishing redeployment of a user app for the user app deployment system of FIG. 7.

FIG. 8 describes the behavior of the service module 110 for the deployment system of FIG. 7, for redeployment of APKs of user apps to Android user devices 151. Because a previous initial deployment of the user app has been already carried out, the install agent 235 is already deployed on the user device 151.

In step 600, a developer makes an incremental change to the classes of a user app (e.g. a change to DEX files 132 of the original user app APK 104) on the host system 150, which triggers the service module 110 to redeploy the currently running instance of the user app on the user device 151. Note that the first time that method step 600 is traversed, the currently running instance of the user app is associated with an initial deployment of the user app in accordance with the deployment system 10-1 of FIG. 1 and its associated method of FIG. 2.

In step 306b, the service module 110 sets up two parallel tasks. One of the tasks produces a modified user app APK 108 on the file system 130 of the host system 150, and deploys a modified user app 208 including a runtime agent 224 from the modified user app APK 108 on the user device, as previously described in steps 320, 322, 324, 326, and 328 of "task B" in the method of FIG. 2. As a result, steps 320 through 328 and label "task B" are included in FIG. 8. The other task, labeled "task C," determines a set of delta DEX files 186 and sends the delta DEX files 186 to the pre-installed install agent 235. Task C begins at step 702.

In step 702, the service module 110 produces a set of changed DEX files 132 since the last install (i.e. delta DEX files 186) and sends the delta DEX files 186, one by one, to the install agent 235 on the user device 151. In one example, the set of delta DEX files 186 is produced by detecting all changes to the underlying class files within the development project. In one example, the DEX files 132 are split by the package to which classes belong. Then, for any changed class file, a delta DEX file 186 is produced for the declared package. Using this scheme, all of the DEX files 132 for which no classes have been changed since the last install will be exactly the same, and they do not need to be sent to the install agent 235.

In step 704, the DEX handler process 263 performs any action required to make sure that the delta DEX files 186 include only one unique instance or version of each underlying class upon receiving the delta DEX files 186. In one example, using the package split method mentioned above, the DEX process handler 263 deletes any pre-existing optimized DEX files 190 within the shared data folder 183 in response to receiving delta DEX files 186 for classes declared within the same packages. In another example, using a DEX scheme where changed class files are compiled into non-package dependent DEX files 132, the DEX handler process 263 traverses the set of pre-existing DEX files 132 and removes individual class entries for each changed class received.

In step 706, the DEX handler process 263 produces optimized DEX files 190 from the delta DEX files 186, stores the optimized DEX files 190 within the shared data folder 183 and returns an acknowledgement back to the DEX file assembler 201 in response to each handled delta DEX file 186.

The paths associated with the creation of tasks B and C in step 306b and deployment and execution of components created therein terminate in step 720, where the service module 110 awaits the next incremental change/update to the user app. In step 722, if the service module 110 detects a change to one of the classes/DEX files 132 of the user app in the original user app APK 104, the method transitions back to 600 to process the next update(s) to the class files/DEX files 132 of the user app and redeploy the user app with the delta DEX files 186. Otherwise, the method transitions back to step 720 to await the next update to the user app.

It is important to note that although the redeployment system 10-2 of FIG. 7 and its associated method in FIG. 8 are described for the redeployment of user apps to Android user devices 151, the same system 10-2 and method can be adapted to enable redeployment of user apps to other user device platforms such as Windows and Apple iOS, in examples. The adaptations required will reference platform-specific archive/package names and may or may not involve optimization of the classes of the user app on the user device 151.

Figure 9A:
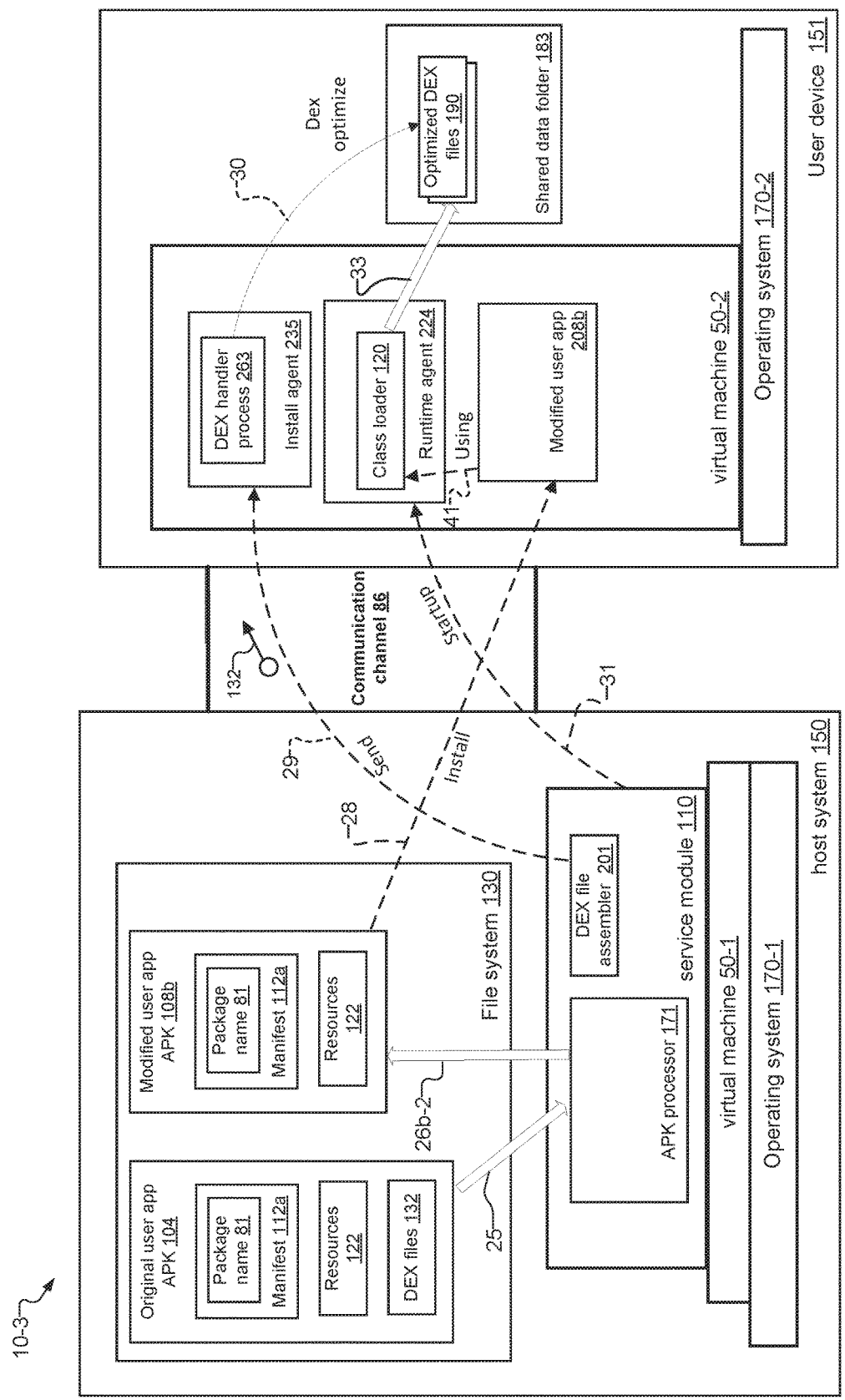
FIG. 9A is a schematic diagram showing a second embodiment of a user app deployment system, where components of the system are pre-installed within a virtual machine of the user device for enabling fast initial deployment of the user app on a user device.

FIG. 9A shows a second embodiment of an exemplary user app deployment system 10-3 to which the invention is applicable, also directed to Android user devices 151. As with the user app deployment system 10-1 of FIG. 1, the deployment system 10-3 of FIG. 9A enables fast initial deployment of user apps to user devices 151.

Unlike the deployment system 10-1 of FIG. 1, which deploys an install agent 235 and modified user app 208/runtime agent 224 as user apps that run on top of the virtual machine 50-2 of the user device 151, the install agent 235 and the runtime agent 224 of deployment system 10-3 are pre-installed within the virtual machine 50-2 on the user device 151. For this purpose, the APK processor 171 creates a modified user app APK 108b. The modified user app APK 108b includes all content of the original user app APK 104 except the DEX files 132, which have been stripped from the original user app APK 104. The creation of the modified user app APK 108b is indicated by arrow 26b-2. The deployed modified user app 208b then utilizes the class loader 120 within the runtime agent 224, indicated by arrow/reference 41. Otherwise, the deployment system 10-1 of FIG. 1 and the deployment system 10-3 of FIG. 9A utilize similar components and function in the same manner.

Figure 9B:
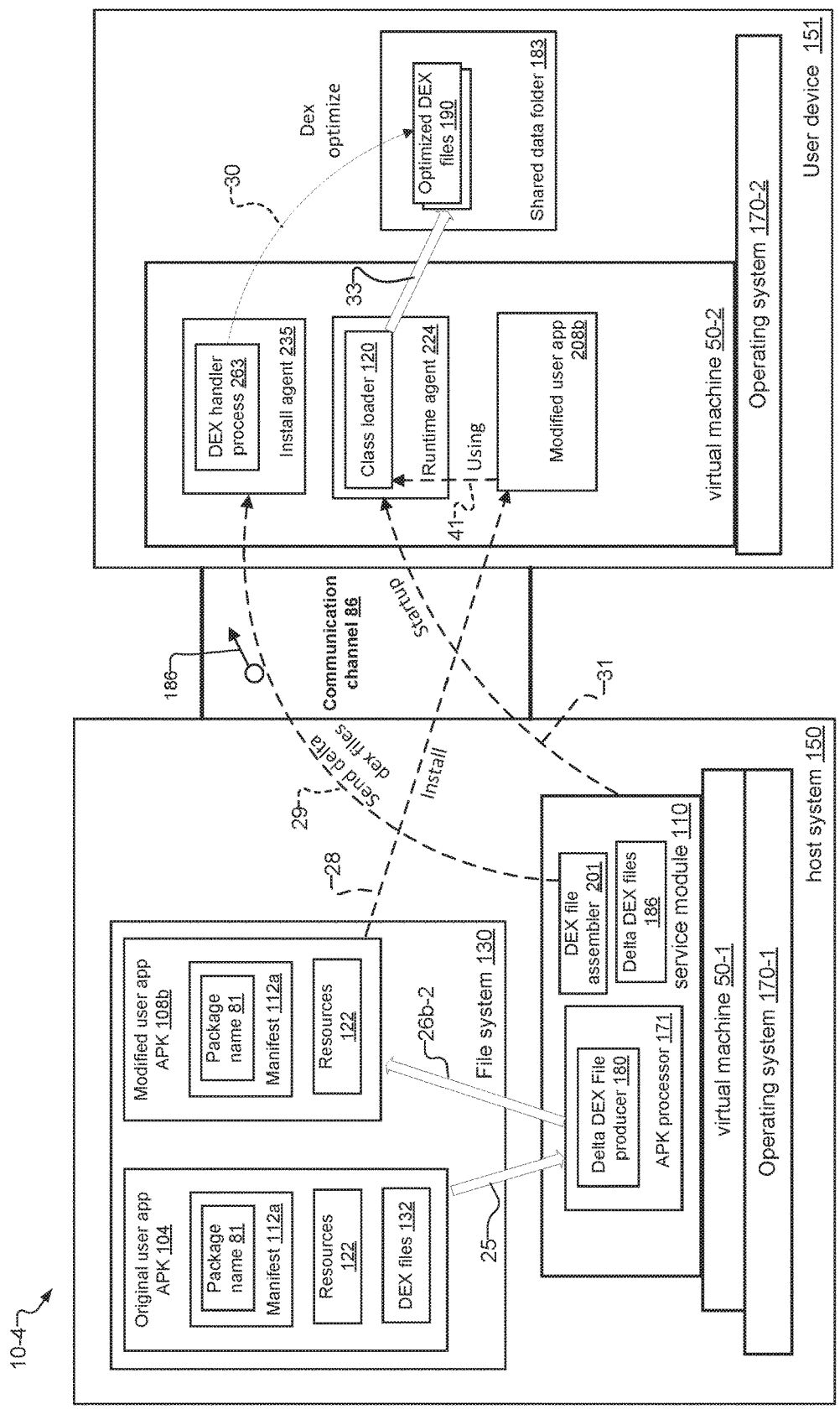
FIG. 9B is a schematic diagram showing another user app deployment system, where the system provides updates to class files of currently running user apps on user devices and redeploys the user apps with the updated class files, when the user apps were initially deployed via the user app deployment system of FIG. 9A.

FIG. 9B shows still another exemplary user app deployment system 10-4 (a redeployment system) to which the invention is applicable, also directed to Android user devices 151. System 10-4 enables incremental updates to user apps, when the user apps were initially deployed by the user app deployment system 10-3 in FIG. 9A.

As with the system 10-2 of FIG. 7, the deployment system 10-4 of FIG. 9B enables fast redeployment of user apps to user devices 151. Unlike the deployment system 10-2 of FIG. 7, however, the install agent 235 and the runtime agent 224 of deployment system 10-4 are pre-installed within the virtual machine 50-2 on the user device 151. For this purpose, the APK processor 171 creates a modified user app APK 108b. The modified user app APK 108b includes all content of the original user app APK 104 except the DEX files 132, which have been stripped from the original user app APK 104. The creation of the modified user app APK 108b is indicated by arrow 26b-2. The deployed modified user app 208b utilizes the class loader 120 within the runtime agent 224, indicated by arrow/reference 41. Otherwise, the deployment system 10-2 of FIG. 7 and the deployment system 10-4 of FIG. 9B utilize similar components and function in the same manner.

It is important to note that although the deployment system 10-3 of FIG. 9A and the redeployment system 10-4 of FIG. 9B are described for the redeployment of user apps to Android user devices 151, the same systems 10-3/10-4 can be adapted to enable initial deployment and redeployment of user apps to other user device platforms such as Windows and Apple iOS, in examples. The adaptations required will reference platform-specific archive/package names and may or may not involve optimization of the classes of the user app on the user device 151.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for deploying a user app to a user device, the method comprising:
   a handler process of an install agent executing on the user device receiving class files of the user app and a modified version of the user app from a host system, the handler process later receiving updates to the class files of the user app;
   the handler process creating optimized versions of the received class files of the user app in response to receiving the class files and creating optimized versions of the updated class files in response to receiving the updated class files, the handler process starting the optimization of the received class files and the received updated class files prior to an installation of the user app and the installation of the modified version of the user app, respectively, on the user device, wherein the handler process optimizes the class files and the updated class files for native execution on an operating system of the user device; and
   a runtime agent then loading and executing the optimized versions of the class files of the user app and the updated class files of the modified version of the user app.

2. The method of claim 1, further comprising maintaining the class files of the user app in an application package file using a Dalvik executable (DEX) file format.

3. The method of claim 1, further comprising a service module application of the host system maintaining a user app archive for the user app, wherein the user app archive includes resources, a manifest file, and the class files of the user app.

4. The method of claim 1, wherein a service module application executing on the host system deploys the install agent and the runtime agent to the user device.

5. The method of claim 4, further comprising the service module application creating a modified user app archive for deployment of the modified version of the user app on the user device, wherein the modified user app archive includes resources of a user app archive for the user app and includes a patched manifest file based upon a manifest file of the user app archive, and includes classes for creating the runtime agent within the modified version of the user app.

6. The method of claim 4, further comprising the service module application creating an install agent archive for deployment of the install agent on the user device, wherein the install agent archive includes an install manifest file based upon a manifest file of a user app archive for the user app and includes classes of the handler process for receiving the class files of the user app.

7. The method of claim 4, further comprising the install agent receiving the class files of the user app in response to the service module application deploying the install agent.

8. The method of claim 4, further comprising the service module application sending a start signal to the runtime agent, the runtime agent loading and executing the optimized versions of the class files of the user app in response to receiving the start signal.

9. The method of claim 1, further comprising a class loader of the runtime agent loading and executing the optimized versions of the class files of the user app.

10. The method of claim 1, further comprising:
    the handler process receiving updates to the class files of the user app and creating optimized versions of the received updated class files in response to receiving each of the received updated class files; and
    a class loader of the runtime agent loading and executing the optimized versions of the updated class files of the user app to redeploy the user app on the user device.

11. The method of claim 1, wherein the install agent including the handler process is pre-installed within a virtual machine of the user device.

12. The method of claim 1, wherein the runtime agent is pre-installed within a virtual machine of the user device.

13. A system for deploying a user app, the system comprising:
    a host system, which is a computer system including a processor, maintaining class files of the user app; and
    a user device that executes a runtime agent and an install agent with a handler process;

wherein the handler process receives the class files of the user app and updates to the class files of the user app from the host system, and wherein the handler process creates optimized versions of the received class files in response to receiving the class files and creating optimized versions of the updated class files in response to receiving the updated class files, and wherein the handler process starts the optimization of the received class files and the received updated class files prior to an installation of the user app and the installation of the modified version of the user app, respectively, on the user device, wherein the handler process optimizes the class files and the updated class files for native execution on an operating system of the user device; and the runtime agent loads and executes the optimized versions of the received class files of the user app and the updated class files of the modified version of the user app.

14. The system of claim 13, wherein the user device is an Android user device.

15. The system of claim 13, wherein the host system includes a service module application executing upon the host system that deploys the install agent and the runtime agent to the user device.

16. The system of claim 13, wherein the class files of the user app are included within an application package file having a Dalvik executable (DEX) file format.

17. The system of claim 13, wherein the host system maintains a user app archive that includes the class files of the user app, and maintains a modified user app archive that includes resources of the user app archive and a patched manifest file based upon a manifest file of the user app archive and includes classes for creating the runtime agent.

18. The system of claim 13, wherein the runtime agent loads and executes the optimized versions of the received class files of the user app in response to receiving a start signal from the host system.

19. The system of claim 13, wherein the runtime agent includes a class loader that loads the optimized versions of the received class files of the user app onto a virtual machine of the user device.

20. The system of claim 13, wherein the host system includes a service module application that determines updates to the class files of the user app and sends the updated class files to the handler process, and wherein the handler process receives the updates to the class files from the service module and creates optimized versions of the received updated class files of the user app in response to receiving each of the received updated class files, and wherein the runtime agent loads and executes the optimized versions of the received updated class files of the user app.

21. The system of claim 13, wherein the runtime agent is included within a virtual machine of the user device, which has been pre-installed within the virtual machine.

22. The system of claim 13, wherein the install agent is included within a virtual machine of the user device, which has been pre-installed within the virtual machine.

23. The method of claim 1, further comprising the class files having a Dalvik executable (DEX) file format, and wherein the handler process optimizes the class files for native execution on an Android operating system of the user device.

24. The system of claim 13, wherein the class files are in a Dalvik executable (DEX) file format, and wherein the handler process optimizes the class files for native execution on an Android operating system of the user device.

* * * * *